Patented Nov. 17, 1942

2,302,576

UNITED STATES PATENT OFFICE 2,302,576

POLYMERIZATION OF ROSIN AND ROSIN ESTERS

Alfred L. Rummelsburg, Wilmington, Del., assignor to Hercules Powder Company, Wilmington, Del., a corporation of Delaware No Drawing. Application June 12, 1940, Serial No. 340,094

13 Claims. (Cl. 260—97)

This invention relates to the polymerization of rosin and rosin esters so as to increase their molecular weight and melting point, and more particularly to such a process of polymerization wherein fluoboric acid or dihydroxy fluoboric acid is employed as the catalyst for the polymerization reaction.

Rosin and rosin esters have heretofore been polymerized with various polymerizing agents such as sulfuric acid, boron trifluoride and other polymerizing materials. However, prior methods of polymerization have presented numerous disadvantages and none of them is entirely satisfactory. Sulfuric acid is too violent and causes an objectionable tendency towards discoloration and charring.

Boron trifluoride is disadvantageous for various reasons, among which is the fact that upon contact thereof with the rosin for a period of time sufficient to bring about maximum polymerization and melting point, the acid number of the original rosin is so lowered that the product is not suitable for many purposes. In addition, boron trifluoride is gaseous at ordinary temperatures and must be employed either in the gaseous form or dissolved in a solvent which is inconvenient and introduces undesirable complexity. Moreover, boron fluoride is toxic and inconvenient to handle, and presents great hazard to personnel because of its highly volatile and poisonous nature.

It is an object of the present invention to provide an improved process for the polymerization of rosin and esters thereof.

Another object is to provide such a process wherein an improved catalyst is employed which brings about polymerization more effectively and results in the production of a product having improved properties.

Another object is to provide a process wherein the catalyst may be readily and economically recovered at the completion of polymerization for use in a subsequent run.

Another object is to provide a process of the foregoing type wherein there is employed as catalyst a compound of boron and fluorine which is liquid at ordinary temperatures and under the conditions of the reaction, which is convenient to handle, and which presents a reduced hazard to personnel and equipment.

Other objects will more fully hereinafter appear.

These objects are accomplished in accordance with the present invention by employing as the catalyst for the polymerization of rosin, rosin esters, and mixtures of rosin and rosin esters, a compound of boron and fluorine which is liquid at room temperature, the polymerizing conditions being maintained for a period of time sufficient to substantially increase the melting point of the raw material. In a preferred form, the catalyst is a liquid complex acid of boron and fluorine having a boiling point within the range of from about 120° C. to 160° C. and is selected from the group consisting of fluoboric acid and dihydroxy fluoboric acid.

In accordance with the present invention, there is provided a process whereby the rosin or rosin ester is polymerized with substantial increase in the melting point thereof, by treating the rosin or rosin ester with fluoboric acid or dihydroxy fluoboric acid or mixtures thereof.

In carrying out the process the rosin or rosin ester to be polymerized is preferably dissolved in a volatile organic solvent therefor, and for the polymerization product. The solvent employed may be of any suitable type which is inert with respect to the rosin or rosin ester and with respect to the catalyst employed. The solvent used may be an aromatic hydrocarbon such as benzene or toluene, suitable fractions of petroleum hydrocarbons, such as gasoline, V. M. & P. naphtha, petroleum ether, etc., hydrogenated petroleum naphtha, chlorinated hydrocarbons, such as carbon tetrachloride, trichlorethylene, chlorinated benzene, ethylene dichloride, or hydrogenated cyclic hydrocarbons such as hydrogenated naphthalene such as tetrahydronaphthalene, decahydronaphthalene, cyclohexane, etc. The concentration of rosin or rosin ester in the solution may vary over a wide range as, for example, from about 10% to about 75% by weight based on the weight of the solution.

The liquid catalyst is then added to the solution preferably with agitation. The catalyst generally goes into solution in the solvent employed. The addition of the catalyst usually causes the liberation of some heat and a change of color of the solution to a deep red or purple.

Following the addition of the catalyst to the solution, the mixture which is, in most cases, completely homogeneous, is allowed to stand for a prolonged period of time, so as to effect the desired polymerization. The period of time required will vary from about two hours to about three days, depending upon the extent of polymerization desired and the temperature at which the polymerization is carried out. If the temperature is elevated, the shorter periods of time may be employed.

The temperature at which the polymerization is conducted is variable within wide limits and may, for example, vary from below room temperature, say about 5° C. to about 120° C. depending upon the solvent employed, the speed of polymerization, and the type of product desired. Generally speaking, the employment of temperatures not materially above room temperatures is desirable because it precludes undue formation of color bodies during the reaction.

If desired, the polymerization process may be so carried out as to effect a refining action as well as a polymerizing action. Thus, for example, by employing a solvent such as petroleum hydrocarbons, such as gasoline or V. M. & P. naphtha, the small amount of sludge present originally (derived from the rosin or rosin ester) or formed during the reaction, settles out because of its insolubility in such solvents. Thus, a refining action is effected simultaneously with the polymerization with the result that the product is lighter colored than the raw material, and, at the same time, the melting point of the product is increased. Sometimes in the case of aromatic solvents, such as benzene or toluene, such a sludge forms, the formation or absence of formation apparently depending among other factors upon the concentration of rosin or rosin ester. When chlorinated solvents, such as ethylene dichloride are employed, no such sludge forms because of its ready solubility in such solvents.

The process of the present invention is particularly advantageous when applied to rosin because it can be so carried out if desired that the acid number of rosin treated thereby is not appreciably lowered by the process, even though the rosin and the catalyst be in contact for a prolonged period of time.

As the catalyst, I prefer to employ fluoboric acid itself (HBF$_4$). Instead of fluoboric acid I may use dihydroxy fluoboric acid (HBF$_2$(OH)$_2$). Fluoboric acid and dihydroxy fluoboric acid are readily and economically prepared and have excellent catalytic activity for the polymerizing of rosin or rosin ester.

Fluoboric acid (HBF$_4$) may be prepared by reacting hydrogen fluoride with boric anhydride (B$_2$O$_3$) according to the reaction:

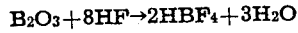

A convenient method of preparing fluoboric acid is as follows: About 55 g. of 48% hydrofluoric acid was carefully added to 5 g. of boric anhydride in a platinum evaporating dish. The solution was heated to boiling for concentration, evaporation being discontinued when dense white fumes were evolved. About 17 g. of crude product in liquid form remained, this product containing a small amount of water, the complete removal of water being difficult because pure fluoboric acid boils at 120° C. which is close to the boiling point of water. This crude material contained about 98% of fluoboric acid. Fluoboric acid in a pure state may be prepared by employing commercial anhydrous hydrofluoric acid and treating the boric anhydride therewith, and this latter process of preparation may be still further improved by carrying out the reaction in the presence of a material which has a marked avidity for water, such as concentrated sulfuric acid or the like and which absorbs the water of condensation as rapidly as it is formed.

Dihydroxy fluoboric acid may be prepared in any desired manner. One way is by collecting the high boiling distillate given off during the preparation of boron trifluoride by reaction of calcium fluoride, boric anhydride and concentrated sulfuric acid, the liquid which is distilled from the heated generator and which condenses in the first trap of the boron fluoride recovery system being nearly pure dihydroxy fluoboric acid contaminated with a small amount of boron trifluoride which may be removed if desired by distillation. About 2 c. c. of the liquid relatively pure dihydroxy fluoboric acid condenses in the first trap for every 25 to 30 g. of boron trifluoride generated. This compound may also be prepared by reacting an excess of boron trifluoride with boric acid. Pure dihydroxy fluoboric acid has a boiling point of about 160° C.

The amount of catalyst employed may be varied within quite wide limits and may, for example, vary from about 0.5% to about 40% and preferably from about 1.5% to about 15% by weight based on the weight of rosin or rosin ester to be polymerized. These ranges are based on the pure catalyst.

Preferably, the reaction mixture is agitated throughout the polymerization process in order to bring about a more rapid reaction. However, such agitation may in some cases be eliminated without objectionably slowing up the reaction.

Preferably after the reaction has been carried out to the desired extent of polymerization, the solution of polymerized material in the organic solvent employed may be separated from any sludge and washed with water or other aqueous washing liquid. Where fluoboric acid is employed as the catalyst, the wash liquid contains fluoboric acid in substantially unchanged form and this acid may be readily recovered from the wash water by adding a suitable metallic compound, the metal of which forms a water insoluble fluoborate, thereby precipitating the water insoluble metallic salt. For example, by adding potassium chloride in solid form to the aqueous wash liquid there is precipitated the water-insoluble potassium fluoborate. Likewise, by adding calcium chloride or calcium hydroxide, there may be precipitated on evaporation calcium fluoborate. The precipitate may be separated in any manner and treated with a strong acid such as sulfuric acid or hydrochloric acid which causes liberation of pure fluorboric acid, which can be obtained by distilling the mixture. Thus, it is particularly advantageous to use fluoboric acid as the catalyst because of the ease with which it may be recovered for use in a subsequent polymerization reaction.

In most cases, the polymerized rosin or rosin ester will be recovered from the washed solution in any suitable manner as, for example, by evaporation of the solvent therefrom, leaving the polymerized material. The polymerized material may be treated in any desired manner to purify it or improve its color either before or after its separation from the solvent. For example, the solution may be treated with activated carbon, activated clay, or other absorbent material to remove color bodies from the product.

Where a sludge forms, the mixture after polymerization may be treated according to two methods. It may be commingled intimately with water which decomposes the sludge (which is a polymer-catalyst association product) liberating the polymer which goes into solution in the organic solvent present and is subsequently recovered in intimate admixture with the polymer already in solution upon evaporation of the solvent. Alternatively, the solution of polymer may be separated from the sludge after which the sludge may be treated to separately recover the polymer therefrom as by intimate admixture with water to decompose the sludge, extraction of the polymer from the decomposed residue with any suitable solvent, such as benzene, gasoline, ether or the like, and evaporation to yield a dark-colored polymer more highly polymerized than the polymer which went into solution during polymerization. This dark-colored polymer may be treated to reduce its color and may be blended as desired with the polymer recovered from the solution layer.

The method may be employed as a batch process or it may be used as a continuous process in which case a suitable solution of rosin or rosin ester may be fed continuously through a reaction zone provided with suitable temperature control wherein the liquid catalyst contemplated herein is mixed therewith in suitable amount. After the mixture is continuously withdrawn from the reaction zone, it may be continuously treated to recover the rosin or rosin ester in polymerized form and, in the case where fluoboric acid is employed as the catalyst, the wash liquid may be continuously treated in any desired manner to recover the fluoboric acid which is continuously returned to the reaction zone and used in the cyclic process.

The rosin treated in accordance with the present invention may be any one of the known types such as any grade of French or American gum rosin, any grade of wood rosin including those refined by various methods known to the art, abietic acid, pimaric acid, sapinic acid, heat treated rosin, etc.

The rosin ester treated in accordance with the present invention may be either a monohydric alcohol ester or a polyhydric alcohol ester. Thus, polyhydric alcohol esters, such as, for example, ethylene glycol abietate, diethylene glycol abietate, triethylene glycol abietate, diglycol abietate, glycerol abietate, sorbitol abietate, mannitol abietate, erythritol abietate, pentaerythritol abietate, etc., may be polymerized by this method. Monohydric alcohol esters of wood rosin, such as, for example, alkyl abietates, as methyl, ethyl, propyl, butyl, amyl, cetyl, lauryl, stearyl, etc.; aromatic abietates, as, phenyl, benzyl, etc., and other abietates, as, abietyl, hydroabietal, furfuryl, hydrofurfuryl, cyclohexyl abietate, etc., may likewise be polymerized by this method. Furthermore, the analogous esters of French gum rosin, American gum rosin, and other rosins, and of the purified rosin acids, as pimaric acid, sapinic acid, etc., may be treated by this method. Such rosin esters may be completely esterified or they may contain a small amount of unesterified rosin acid.

Instead of using a pure rosin ester, mixtures of the rosin esters may be employed, or a mixture of rosin ester and rosin itself may be treated in accordance with the present invention.

The polymerized product of the present invention is characterized by a melting point of from about 5° C. to about 50° C. higher than that of the original material. Rosin, polymerized by the process of the present invention may or may not have an acid number which is lower than that of the original rosin. The acid number of the product may be controlled by varying the conditions of polymerization. Thus, by the use of higher reaction temperatures (near 100° C.) and larger amounts of catalyst (15 to 40% by weight based on weight of rosin taken), the acid number of the product may be made markedly lower than that of the original rosin. A maximum lowering of 30 to 50% in acid number is possible in this way, whereby polymerized rosin having an acid number of 114 down to 82 may be prepared.

Following are several specific examples illustrating various ways of carrying out the process of the present invention.

*Example 1*

Fifty-four grams of I wood rosin were dissolved in 108 g. of benzene and to this solution about 3.5 g. of crude fluoboric acid were added at room temperature with constant agitation. The solution assumed a deep purple color, with a slight increase in temperature (about 3° C.). The mixture was allowed to stand without agitation for 2½ days whereupon the mixture was washed with water three times, the washed solution being dried and evaporated to remove the benzene and to recover the rosin. The product had an acid number of 164 and a melting point of 96° C. The color of the product was about the same as that of the original. I wood rosin has an acid number of 163 and a melting point of 80° C.

*Example 2*

One hundred twenty grams of I wood rosin were dissolved in 230 g. of benzene and 2 g. of crude fluoboric acid were added to the solution. The mixture was heated on a steam bath at the refluxing temperature (90° C.) for five hours. The solution was washed with water until the fluoboric acid and decomposition products thereof had been completely removed, whereupon the washed solution was dried and evaporated to remove the solvent and recover the polymerized rosin. The product had an acid number of 168 and a melting point of 92° C. The color was about the same as that of the original rosin.

*Example 3*

Twenty grams of I wood rosin were dissolved in 30 g. of benzene. The solution was cooled to 17° C. 2.5 g. of crude dihydroxy fluoboric acid, collected in the first trap as a by-product in the manufacture of boron trifluoride as described above, was added to the solution. The mixture turned deep red in color and after standing 24 hours was washed with water until the wash liquids showed no content of boron or fluorine compounds. The solution was dried and evaporated to recover the polymerized rosin. The product had an acid number of 166, a melting point of 91° C. and had substantially the same color as that of the original.

*Example 4*

To a solution of 120 g. of N wood rosin ester gum in 200 g. of benzene was added 10 g. of liquid HBF₄ gradually with stirring at room temperature. The solution turned a deep purple and a slight exothermic reaction was noted. After standing at room temperature for four days, the solution was water washed to remove the catalyst and the solvent distilled off at reduced pressure. The original ester gum and the product has the following characteristics:

| | Original ester gum | Polymerized ester gum |
|---|---|---|
| Acid number | 8 | 7 |
| Melting point (drop) °C | 89 | 110 |
| (SCN)$_2$ value | 85 | 65 |
| Color | N | H |

The process of this example may be modified by reducing the amount of catalyst somewhat and increasing the temperature, say to 80° C. (preferably using a closed vessel or a reflux condenser) when the reaction is complete in several hours.

*Example 5*

To a solution of 200 g. K wood rosin in 700 g. gasoline which was free from olefins, was added 50 g. crude $HBF_4$ with agitation and cooling at 20° C. The reaction mixture was agitated for a period of five hours at 15° C., then decanted from sludge which had separated. The gasoline solution was water washed. Evaporation of the solvent at reduced pressure, using a final bath temperature of 220° C. and pressure of 10 mm., left 170 g. product.

|  | Original | Treated |
|---|---|---|
| Acid number | 164 | 150 |
| Melting point (drop) °C | 81 | 99 |
| (SCN)$_2$ value | 92 | 85 |
| Color | K | K+ |

It will be understood that the details and examples hereinbefore set forth are illustrative only and that the invention as broadly described and claimed is in no way limited thereby.

What I claim and desire to protect by Letters Patent is:

1. The process of polymerizing a material selected from the group consisting of rosin and rosin esters, which comprises treating said material in solution in a volatile organic solvent with a catalyst selected from the group consisting of fluoboric acid and dihydroxy fluoboric acid at a temperature of from about 5° C. to about 120° C. under polymerizing conditions for a period of time sufficient to materially increase the melting point of said material.

2. The process of polymerizing rosin which comprises treating said rosin in solution in a volatile organic solvent with a catalyst selected from the group consisting of fluoboric acid and dihydroxy fluoboric acid at a temperature of from about 5° C. to about 120° C. under polymerizing conditions for a period of time sufficient to materially increase the melting point of said rosin.

3. The process of polymerizing a rosin ester which comprises treating said rosin ester in solution in a volatile organic solvent with a catalyst selected from the group consisting of fluoboric acid and dihydroxy fluoboric acid at a temperature of from about 5° C. to about 120° C. under polymerizing conditions for a period of time sufficient to materially increase the melting point of said rosin ester.

4. The process of polymerizing a material selected from the group consisting of rosin and rosin esters which comprises treating said material in solution in a volatile organic solvent with fluoboric acid at a temperature of from about 5° C. to about 120° C. under polymerizing conditions for a period of time sufficient to materially increase the melting point of said material.

5. The process of polymerizing a material selected from the group consisting of rosin and rosin esters, which comprises treating said material in solution in a volatile organic solvent with dihydroxy fluoboric acid at a temperature of from about 5° C. to about 120° C. under polymerizing conditions for a period of time sufficient to materially increase the melting point of said material.

6. The process of polymerizing a material selected from the group consisting of rosin and rosin esters, which comprises treating said material in solution in a volatile organic solvent with fluoboric acid at a temperature of from about 5° C. to about 120° C. under polymerizing conditions for a period of time sufficient to materially increase the melting point of said material, washing the resulting mixture with water, recovering polymerized material from the washed mixture, commingling with the wash liquid a compound of a metal which forms a water insoluble fluoborate and precipitating the fluoboric acid as a water insoluble fluoborate, separating the precipitate and treating it with a strong mineral acid to liberate fluoboric acid, recovering the liberated fluoboric acid in concentrated form and re-using the thus recovered fluoboric acid in a subsequent repetition of the process.

7. The process of polymerizing a material selected from the group consisting of rosin and rosin esters, which comprises treating said material in solution in a volatile organic solvent with a catalyst selected from the group consisting of fluoboric acid and dihydroxy fluoboric acid, said catalyst being employed within the range of from about 0.5% to about 20% by weight based on the weight of said material, at a temperature within the range of from about 5° C. to about 120° C., and for a period of time within the range of from about two hours to about three days whereby there is obtained a polymerized material having a substantially increased melting point.

8. The process of polymerizing a material selected from the group consisting of rosin and rosin esters in solution in a volatile organic solvent which comprises treating said material with a catalyst selected from the group consisting of fluoboric acid and dihydroxy fluoboric acid, said catalyst being employed within the range of from about 0.5% to about 20% by weight based on the weight of said material, at a temperature within the range of from about 5° C. to about 120° C., and for a period of time within the range of from about two hours to about three days, and recovering the polymerized material from the solution by evaporation of the solvent, whereby there is obtained a polymerized material having a substantially increased melting point.

9. The process of polymerizing a material selected from the group consisting of rosin and rosin esters in solution in a volatile organic solvent which comprises treating said material with a catalyst selected from the group consisting of fluoboric acid and dihydroxy fluoboric acid, said catalyst being employed within the range of from about 0.5% to about 20% by weight based on the weight of said material, at a temperature within the range of from about 10° C. to about 120° C., and for a period of time within the range of from about two hours to about three days, washing the solution with water until boron and fluorine are removed therefrom, and recovering the polymerized material from the washed solution by evaporation of the solvent, whereby there is obtained a polymerized material having a substantially increased melting point.

10. The process of polymerizing a material selected from the group consisting of rosin and rosin esters which comprises treating a solution thereof in a volatile hydrocarbon solvent with a catalyst selected from the group consisting of fluoboric acid and dihydroxy fluoboric acid at a temperature of from about 5° C. to about 120° C. under polymerizing conditions for a period of time sufficient to materially increase the melting point of said material, said solvent and the conditions of polymerization being such as to cause a sludge to be present at the completion of said treatment, and subsequently recovering polymerized material from both the sludge and the solution.

11. The process of polymerizing a material selected from the group consisting of rosin and rosin esters, which comprises treating a solution thereof in a volatile hydrocarbon solvent with a catalyst selected from the group consisting of fluoboric acid and dihydroxy fluoboric acid at a temperature of from about 5° C. to about 120° C. under polymerizing conditions for a period of time sufficient to materially increase the melting point of said material, said solvent and the conditions of polymerization being such as to cause a sludge to be present at the completion of said treatment, separating the resulting solution from said sludge, and subsequently recovering polymerized material from the solution so separated.

12. The process of polymerizing a material selected from the group consisting of rosin and rosin esters, which comprises treating a solution thereof in a volatile hydrocarbon solvent with a catalyst selected from the group consisting of fluoboric acid and dihydroxy fluoboric acid at a temperature of from about 5° C. to about 120° C. under polymerizing conditions for a period of time sufficient to materially increase the melting point of said material, said solvent and the conditions of polymerization being such as to cause a sludge to be present at the completion of said treatment, separating the resulting solution from said sludge, treating said solution to recover polymerized material therefrom, reacting said sludge with water and treating the resulting residue to recover polymerized material therefrom.

13. The process of polymerizing a material selected from the group consisting of rosin and rosin esters, which comprises treating a solution thereof in a volatile hydrocarbon solvent with a catalyst selected from the group consisting of fluoboric acid and dihydroxy fluoboric acid at a temperature of from about 5° C. to about 120° C. under polymerizing conditions for a period of time sufficient to materially increase the melting point of said material, said solvent and the conditions of polymerization being such as to cause a sludge to be present at the completion of said treatment, reacting the resulting mixture with water to decompose the sludge and cause polymerized material derived therefrom to go into solution in said solvent, and subsequently recovering polymerized material from said solution.

ALFRED L. RUMMELSBURG.